United States Patent [19]
Niimi et al.

[11] 3,935,797
[45] Feb. 3, 1976

[54] WEAR AND SEIZURE RESISTANT ALUMINUM ALLOY PISTON

[75] Inventors: Itaru Niimi, Nagoya; Yasuhisa Kaneko, Toyota; Yoshiro Komiyama, Okazaki; Masaaki Tokui, Toyota; Katsumi Kondo, Toyota; Akio Kouno, Toyota, all of Japan

[73] Assignee: Toyota Jidosha Kogyo Kabushiki Kaisha, Toyota, Japan

[22] Filed: Nov. 8, 1973

[21] Appl. No.: 413,821

[30] Foreign Application Priority Data
Jan. 9, 1973 Japan.................................. 48-5457

[52] U.S. Cl. ...................... 92/223; 427/34; 308/241
[51] Int. Cl.² ......................................... F02B 23/00
[58] Field of Search...... 123/193 D, 193 CP, 191 A; 117/104, 105, 105.1, 105.2, 130 R, 93.1 PF, 46 FS; 92/223; 308/241

[56] References Cited
UNITED STATES PATENTS
| | | | |
|---|---|---|---|
| 1,441,468 | 1/1923 | Wills | 123/191 A |
| 3,077,659 | 2/1963 | Holzworth | 117/105.2 |
| 3,405,610 | 10/1968 | Hill et al. | 92/223 |

*Primary Examiner*—Wendell E. Burns
*Assistant Examiner*—David D. Reynolds
*Attorney, Agent, or Firm*—Brisebois & Kruger

[57] ABSTRACT

An aluminum alloy piston for an internal combustion engine, which has been made wear and seizure resistant by forming an adherent coating on at least the skirt of said piston, by applying thereto an iron-carbon powder containing less than 0.3% by weight of C, the balance being substantially all iron. A film of manganese phosphate may be subsequently applied to said skirt.

9 Claims, 7 Drawing Figures

WEAR AND SEIZURE RESISTANT ALUMINUM ALLOY PISTON

BACKGROUND OF THE INVENTION

It is well-known that in the piston of an internal combustion engine having a cast-iron cylinder liner and an aluminum alloy piston heavy wear in the skirt of the aluminum alloy piston poses a problem, and the surface of the skirt is commonly tin-plated to assure a good initial break-in. Since such a combination of an aluminum cylinder liner and an aluminum alloy piston is liable to seizure and the aluminum alloy piston lacks resistance to wear, chrome-plating of the aluminum cylinder liner to compensate for these drawbacks is also common practice.

SUMMARY OF THE INVENTION

The object of the present invention is to improve the resistance to wear and seizure of an aluminum alloy piston of an internal combustion engine by coating the vulnerable part of the piston with iron and at the same time reducing the engine weight.

REFERENCE TO DRAWINGS

FIGS. 1 and 2 respectively show the skirt of an aluminum alloy piston and its vulnerable part which is to be coated to improve its wear resistance.

DETAILED DESCRIPTION OF THE INVENTION

According to the present invention, in an assembly comprising an aluminum cylinder liner and an aluminum alloy piston the part of the aluminum alloy piston which is liable to heavy wear can be successfully made wear and seizure resistant by being coated with iron, while the aluminum cylinder liner is left unchanged.

Of course, this invention is applicable to an assembly comprising a cast iron cylinder liner and an aluminum alloy piston.

Practical applications of this invention are illustrated in the attached drawings and micrographs.

Figure 1:
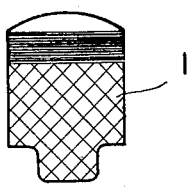

The grid on FIG. 1 shows the area 1 on the skirt of an aluminum alloy piston which is to be coated with iron.

Figure 2:
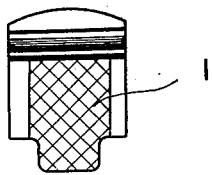

The grid on FIG. 2 shows the area 1 on the skirt of an aluminum alloy piston which is to be coated when the coating is limited in its application.

As illustrated in an experimental example to be cited later, said area on the piston skirt is coated with iron as follows: A piston which has first been reduced in its diameter by the thickness of the coating to be applied is washed with "Triclene" (trichloroethylene) and fully dried. The area to be coated is then blasted with silica sand and thereafter coated with a powder composed of 0.3% carbon, with the balance substantially all iron, using the plasma spray method, followed by grinding to a finish.

It should be noted that the iron in the powder of course contains some impurities.

Figure 3:
FIG. 3 is a micrograph showing a section of the part of the piston which has been coated with iron according to the present invention, enlarged 200 times.

FIG. 3 is a micrograph showing a section of the coated area of FIG. 1 after it has been ground to a finish.

Figure 4:
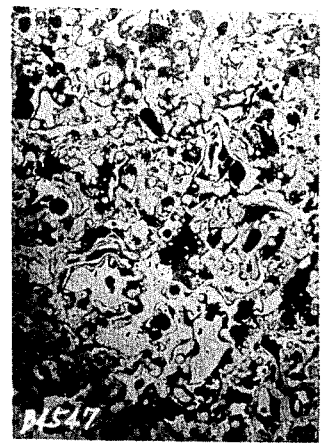
FIG. 4 is a micrograph showing the iron-coated surface of a piston of this invention, enlarged 100 times.

FIG. 4 is a similar micrograph which shows the surface of the metallized area, over which iron and carbon (looking gray) and blowholes (looking black) are scattered.

When the above iron-coating step is followed by further coating of the surface with a film of manganese phosphate, the wear resistance will be even more substantially improved.

Figure 5:
FIG. 5 is a micrograph showing the surface of a piston which has been first coated with iron and then coated with a film of manganese phosphate, enlarged 100 times.

FIG. 5 is a micrograph of the coated surface after it has been subsequently coated with a film of manganese phosphate. On this micrograph the black part corresponds to blowholes, the white part to the sprayed iron, and the gray part to the film of manganese phosphate.

Figure 6:
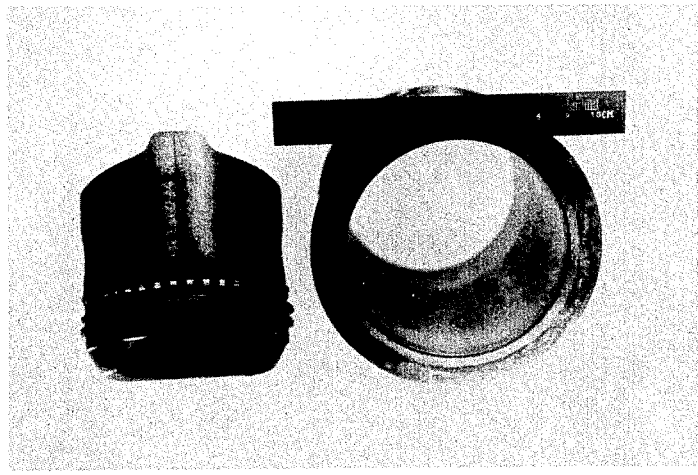
FIG. 6 is a photograph showing an iron-metallized aluminum alloy piston and an aluminum cylinder liner after 100 hours of testing on a stand.

FIG. 6 shows an aluminum alloy piston coated in accordance with the invention and an aluminum cylinder liner after 100 hours of testing on a stand, wherein no scratch is apparent thus exemplifying the wear and seizure resistance of the piston.

Figure 7:
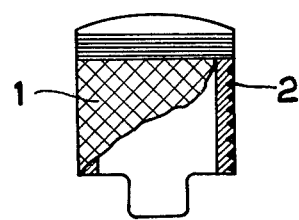
FIG. 7 shows an aluminum alloy piston according to our invention which has been coated with iron and in which a groove has been provided in the piston skirt area to be metallized.

FIG. 7 illustrates an iron-coated piston with a groove 2 provided therein to improve the oil collection.

Thus, the overall effect of iron-coating the surface, whereby the iron improves the wear resistance, the carbon improves lubrication, and scattered blowholes result from spraying, is to impart wear and seizure resistance to the aluminum alloy piston according to the invention. The aluminum alloy piston which has been surface-treated according to the present invention, as compared with a conventionally plated piston, can be produced at less cost and displays a resistance to wear and seizure which cannot be expected from a conventional piston, as a consequence of carbon lubrication, the wear resistant iron, and the spray blowholes and manganese phosphate film which collect the oil. Moreover, the use of an aluminum liner reduces the engine weight.

The coating according to the present invention is done by the plasma spraying method, whereby the metal powder, which is introduced in a plasma jet stream, is melted and sprayed by inertia on to the surface to be coated. The metal powder is carried into the plasma jet stream on an inert gas flowing through a vibrated pipe (diameter 60–80mm).

The optimum grain size of the Fe-C powder used is 200–300 mesh. A grain size of less than 200 mesh would make it hard to transport the powder evenly on the inert gas, resulting in an uneven metallized surface, or in a failure of the powder to be deposited successfully on the surface to be coated, for the powder passes unmolten through the plasma jet stream.

On the contrary, a grain size of more than 350 mesh would make the powder lose its inertia even if it is vigorously accelerated, leading to poor results on account of the weakness of the force with which it hits the surface to be coated. Since the plasma jet stream is as hot as 6000°–8000°C, a powder of small grain size will evaporate, resulting in a poor yield of deposition.

The recommended thickness of the applied layer is 0.4–0.7mm. The present accuracy of grinding is about 0.2mm. Therefore the applied layer, when it is less than 0.4mm thick will become undesirably thin if it is ground down more than 0.2mm. On the other hand, when the coating is more than 0.7mm thick, the deposited powder will become excessively thick and the coating will be liable to separate from the substrate in use. This will also involve a wasteful consumption of material. Thus, the lower limit of the thickness of deposited layer is set by the machining accuracy, while its upper limit is set by the danger of separation of the layer and the yield of material deposited.

Specific examples of the application of the present invention will now be given:

EXAMPLE 1

A piston, the diameter of which had been reduced by twice the coating thickness, i.e., 0.5mm (0.25×2) was washed with trichloroethylene and fully dried. Then the area to be coated was blasted with silica sand 0.2–0.5mm in diameter, and then coated with a material consisting essentially of 0.3% carbon and the balance substantially all iron, to a thickness of 0.4–0.5mm by the plasma spraying method. Thereafter the piston was ground to a finish and subjected to an engine stand test.

A V-8 engine, cylinder bore 78mm, having a stroke of 78mm with a total displacement of 2,981cc equipped with an aluminum cylinder liner (made of a material consisting essentially of Si 17%, Cu 4.5%, Fe 1.0%, Mg 0.5%, Zn less than 0.1%, the balance being aluminum) and an iron-coated piston according to the present invention was put through a break-in test and then an endurance test on the engine stand in accordance with the JISD 1003 loading test. The endurance test conditions were: 4500 rpm at full load and full throttle; cooling water temperature 80°C and lubricant temperature 120°C.

The wear of the piston and cylinder liner were measured in terms of piston diameter and liner bore before and after testing.

The measurements after 100 hours of endurance test on the stand showed that the piston diameter had been reduced through wear by 20–25$\mu$ and the liner bore by 10–15$\mu$; and as observed in FIG. 6, there were no appreciable scratch marks apparent on the surface.

When the aluminum liner was tested with an uncoated piston, both the piston and the liner were scratched, and the wear of the liner was 40–50$\mu$.

Reference Test

A piston, the diameter of which had first been reduced by 0.35mm, i.e., the coating thickness, was gas-sprayed with molybdenum to a thickness of 0.05–0.1mm and then gas-sprayed with a steel wire comprising 0.5–0.8% carbon.

Stand test of a coated piston working in an aluminum cylinder liner was carried out in the same way as in Example 1. According to the results thereof, the wear of the aluminum cylinder liner was greater than in Example 1.

The hardnesses of the coatings resulting from the process of the Example 1 and the Reference Test are listed below:

TABLE 1

| Hardness of metallized layer | | |
|---|---|---|
| Composition of powder | Hardness (Micro Vickers) mHv 100g | Remarks |
| Example 1 (Blend of iron powder and carbon powder) | 200 – 300 | Composed of Fe Fe-oxide, substantial amounts of carbon, and blowholes |
| Reference Fe+5–0.8C (not a powder blend but 0.5–0.8% carbon steel) | 450 – 600 | Composed of Fe, (martensite), Fe-oxide and blowholes |
| Reference (Fe+1–2%C) | 200 – 250 | Composed of Fe, Fe-oxide, a small amount of carbon, and blowholes |

The excellent resistance to wear observed in Example 1 may be attributed to the following facts:
1. The surface of metallized layer is full of blowholes which collect the oil.
2. The combination of dissimilar materials, i.e., aluminum alloy and iron-coating is favorable with respect to resistance to seizure.
3. Since the hardness of iron-coating is not extremely high, the wear is not one-sided.

EXAMPLE 2

For further improvement of wear resistance and initial break-in, the iron-coated piston of Example 1 was subjected to a manganese phosphate treatment (by immersing it for 15 minutes at 100°C in 140 g/l of Parkolubrite-IA (manufactured by the Japan Parkerizing Co.), followed by washing with hot water at 30°–40°C) and then to the same stand test as in Example 1. The test results were somewhat better than those of Example 1, the wear of the piston being 20–25$\mu$ and that of the liner 5–10$\mu$.

Parkolubrite-IA used in this Example comprises 1.2–1.6 g/l of manganese, 2.5–3.5 g/l of iron and 14.5–15.5 g/l of phosphoric ion.

What is claimed is:

1. Aluminum alloy piston which is resistant to wear and seizing, at least the skirt of said piston being coated to a thickness of 0.4–0.7mm with a mixture consisting essentially of both iron and discrete particles of carbon, but containing at most 0.3% by weight of said carbon particles.

2. Piston as claimed in claim 1 in which the coated portion of said piston has been treated with manganese phosphate.

3. Piston as claimed in claim 1 in which said coated surface is provided with an oil-retaining groove.

4. In combination, a piston as claimed in claim 1 and a cylinder made of an aluminum alloy.

5. The method of rendering at least a portion of a piston surface resistant to wear and seizing, which method comprises the step of spray depositing on said surface portion from a plasma jet stream a layer consisting essentially of iron and discrete particles of carbon having a depth of 0.4–0.7 mm, said iron and carbon being supplied in the form of a powder containing 0.3% of said carbon particles by weight, balance essentially all iron.

6. Method as claimed in claim 5 in which said powder is from 200–350 mesh.

7. Method as claimed in claim 6 which comprises the additional step of soaking said surface portion in a manganese phosphate bath after said layer has been applied.

8. Method as claimed in claim 5 in which said layer is plasma sprayed onto said surface.

9. Method as claimed in claim 8 in which said surface is cleaned and sand-blasted before said layer is deposited.

* * * * *